US012009610B2

(12) United States Patent
Wang et al.

(10) Patent No.: US 12,009,610 B2
(45) Date of Patent: Jun. 11, 2024

(54) ELECTRICAL CONNECTOR

(71) Applicant: Advanced Connectek Inc., New Taipei (TW)

(72) Inventors: Shu-Fen Wang, New Taipei (TW); Yi Hsu, New Taipei (TW)

(73) Assignee: Advanced Connectek Inc., New Taipei (TW)

( * ) Notice: Subject to any disclaimer, the term of this patent is extended or adjusted under 35 U.S.C. 154(b) by 250 days.

(21) Appl. No.: 17/583,220

(22) Filed: Jan. 25, 2022

(65) Prior Publication Data

US 2022/0239022 A1 Jul. 28, 2022

(30) Foreign Application Priority Data

Jan. 27, 2021 (TW) ................................ 110201028

(51) Int. Cl.
*H01R 12/57* (2011.01)
*H01R 13/502* (2006.01)
*H01R 13/516* (2006.01)
*H01R 24/60* (2011.01)

(52) U.S. Cl.
CPC ........... *H01R 12/57* (2013.01); *H01R 13/502* (2013.01); *H01R 13/516* (2013.01); *H01R 24/60* (2013.01)

(58) Field of Classification Search
CPC .... H01R 12/57; H01R 13/502; H01R 13/516; H01R 24/60; H01R 12/707; H01R 13/6594; H01R 12/71
USPC ........................................................... 439/83
See application file for complete search history.

(56) References Cited

U.S. PATENT DOCUMENTS 9,525,244 B1 * 12/2016 Hsu ........................ H01R 24/60
2016/0172790 A1 * 6/2016 Chen ...................... H01R 24/62 439/607.01
2016/0380389 A1 * 12/2016 Ju ......................... H01R 12/724 439/607.05
2017/0054246 A1 * 2/2017 Yao .................... H01R 13/6594
2017/0070013 A1 * 3/2017 Hsu .................... H01R 13/6585
2017/0110812 A1 * 4/2017 Tsai ....................... H01R 12/57
2017/0110817 A1 * 4/2017 Tsai ..................... H01R 13/516
2017/0194754 A1 * 7/2017 Tsai ................... H01R 13/6581
2017/0214193 A1 * 7/2017 Tsai ....................... H01R 24/60
2018/0145460 A1 * 5/2018 Ju ...................... H01R 13/6581
2019/0173238 A1 * 6/2019 Ba ...................... H01R 13/6585
2019/0252812 A1 * 8/2019 Chung ............... H01R 13/6275
2019/0363495 A1 * 11/2019 Ju ...................... H01R 13/6594
2020/0274302 A1 * 8/2020 Wang ................ H01R 13/6585
2020/0313364 A1 * 10/2020 Ho ......................... H01R 24/64

* cited by examiner

*Primary Examiner* — Alexander Gilman
(74) *Attorney, Agent, or Firm* — JCIPRNET

(57) ABSTRACT

An electrical connector configured to be assembled to a circuit board is provided. The electrical connector includes an insulating body having a base and a tongue, a plurality of terminals disposed in the insulating body, a first metal shell covering the insulating body, and a second metal shell covering the insulating body and the first metal shell. The first metal shell has a plurality of soldering feet soldered to the circuit board, and the second metal shell has a plurality of second metal pin soldered to the circuit board. The first and the second metal pin are beside the base and away from the tongue. At least one of the first metal shell and the insulating body has a supporting portion abutting against a non-conducting portion of the circuit board. The supporting portion is close to the tongue and away from the base.

20 Claims, 6 Drawing Sheets

ELECTRICAL CONNECTOR

CROSS-REFERENCE TO RELATED APPLICATION

This application claims the priority benefit of Taiwan application serial no. 110201028, filed on Jan. 27, 2021. The entirety of the above-mentioned patent application is hereby incorporated by reference herein and made a part of this specification.

BACKGROUND

Technical Field

The disclosure relates to an electrical connector.

Description of Related Art

When soldering an electrical connector of the related art onto a circuit board by using the surface mounting technology, it is necessary that the electrical connector maintains stable and balanced at the corresponding position of the circuit board before being soldered. If the structure of the electrical connector cannot independently maintain balanced, an additional supporting element is required to support the balance and thereby prevent the electrical connector from falling over.

The conventional supporting elements generally include the structure which extends from the back end of the housing of the electrical connector and is inserted into the circuit board and soldered together, yet there is no supporting structure at the front end of the housing. Consequently, the electrical connector may still be tilted forward after being plugged and unplugged for a long period of time. In view of this, further efforts are still required to develop the electrical connector.

SUMMARY

The disclosure provides an electrical connector which forms a supporting portion by using at least one of a metal housing and an insulating body, so that the electrical connector can be stably held on a circuit board.

An electrical connector of the disclosure is configured to be assembled to a circuit board. The electrical connector includes an insulating body, a plurality of terminals, a first metal shell, and a second metal shell. The insulating body has a base and a tongue. The terminals are disposed in the insulating body. The first metal shell covers the insulating body. The first metal shell has a plurality of first metal pin soldered to the circuit board. The second metal shell covers the insulating body and the first metal shell. The second metal shell has a plurality of second metal pin soldered to the circuit board. The first metal pin and the second metal pin are both located beside the base and away from the tongue. At least one of the first metal shell and the insulating body has a supporting portion abutting against a non-conducting portion of the circuit board, so that the electrical connector is supported on the circuit board, and the supporting portion is close to the tongue and away from the base.

In an embodiment of the disclosure, the electrical connector is a socket electrical connector soldered to a circuit board.

In an embodiment of the disclosure, each of the terminals has a connection end and a soldering end opposite to each other, and the connection end is exposed from the tongue and is configured to be connected with the terminal of another electrical connector. The soldering end protrudes from the base in a direction deviating from the connection end and is soldered to the circuit board. The first metal pin and the second metal pin are close to the soldering end and away from the connection end, and the supporting portion is close to the connection end and away from the soldering end.

In an embodiment of the disclosure, the first metal pin and the second metal pin mentioned above are soldered to a plurality of grounding portions of the circuit board.

In an embodiment of the disclosure, the supporting portion is a partial notch bending structure of the first metal shell.

In an embodiment of the disclosure, the insulating body further includes another supporting portion located in the base and abutting against the circuit board.

In an embodiment of the disclosure, an orthographic projection of the supporting portion on the insulating body is located at a junction of the base and the tongue. Respective orthographic projections of the first metal pin and the second metal pin on the insulating body are located in the base.

In an embodiment of the disclosure, the supporting portion is a protruding column structure extending from the insulating body.

In an embodiment of the disclosure, the protruding column structure is located at a part of the base adjacent to the tongue.

In an embodiment of the disclosure, a part of the first metal pin and a part of the second metal pin are stacked on each other and located on a side of the insulating body, and the supporting portion is located in a bottom portion of the first metal shell and forms a triangle-like supporting configuration with the part of the first metal pin and the part of the second metal pin.

Based on the above, the electrical connector is held on the circuit board by respectively soldering the first metal pin and the second metal pin of the first metal shell and the second metal shell to the circuit board. The first metal pin and the second metal pin are close to the base and away from the tongue with respect to the insulating body, and are close to the soldering end and away from the connection end with respect to the terminal. Accordingly, in the disclosure, at least one of the first metal shell and the insulating body further has the supporting portion, which is close to the tongue and away from the base with respect to the insulating body, and close to the connection end and away from the soldering end with respect to the terminal, so that the supporting portion forms the triangular configuration with the first metal pin and the second metal pin. With a plane formed by three points, the electrical connector is stably held on the circuit board, so as to effectively prevent the electrical connector from tilting forward with respect to the circuit board.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
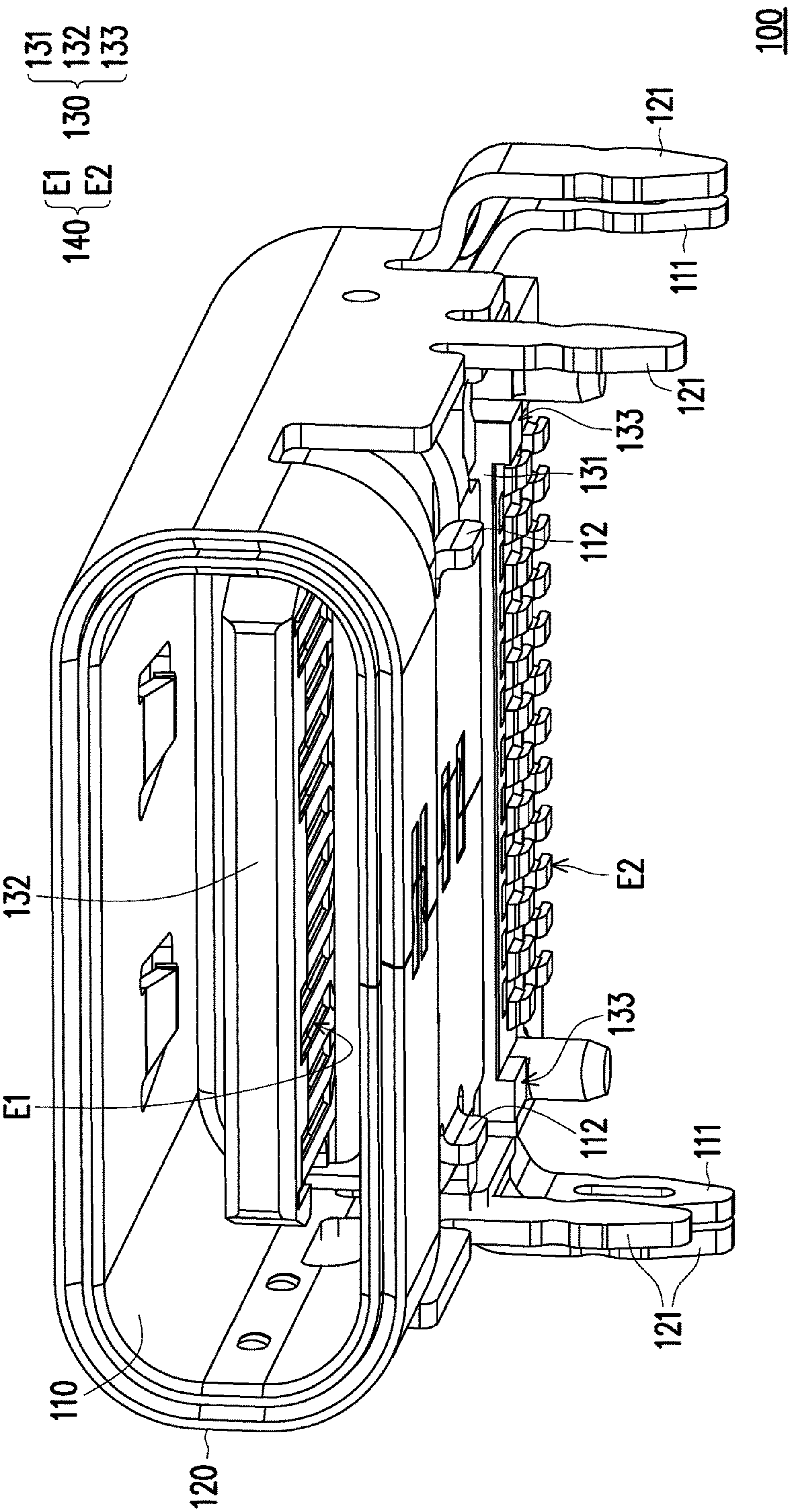
FIG. 1 is a schematic view of an electrical connector according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a schematic view of an electrical connector according to an embodiment of the disclosure. Referring to FIG. 1, in the embodiment, an electrical connector 100 includes an insulating body 130, a plurality of terminals 140, a first metal shell 110, and a second metal shell 120. The insulating body 130 has a base 131 and a tongue 132. The plurality of terminals 140 are disposed in the insulating body 130. The first metal shell 110 covers the insulating body 130. The second metal shell 120 covers the insulating body 130 and the first metal shell 110, that is, as shown in FIG. 1, the second metal shell 120 is substantially stacked outside the first metal shell 110.

Figure 2:
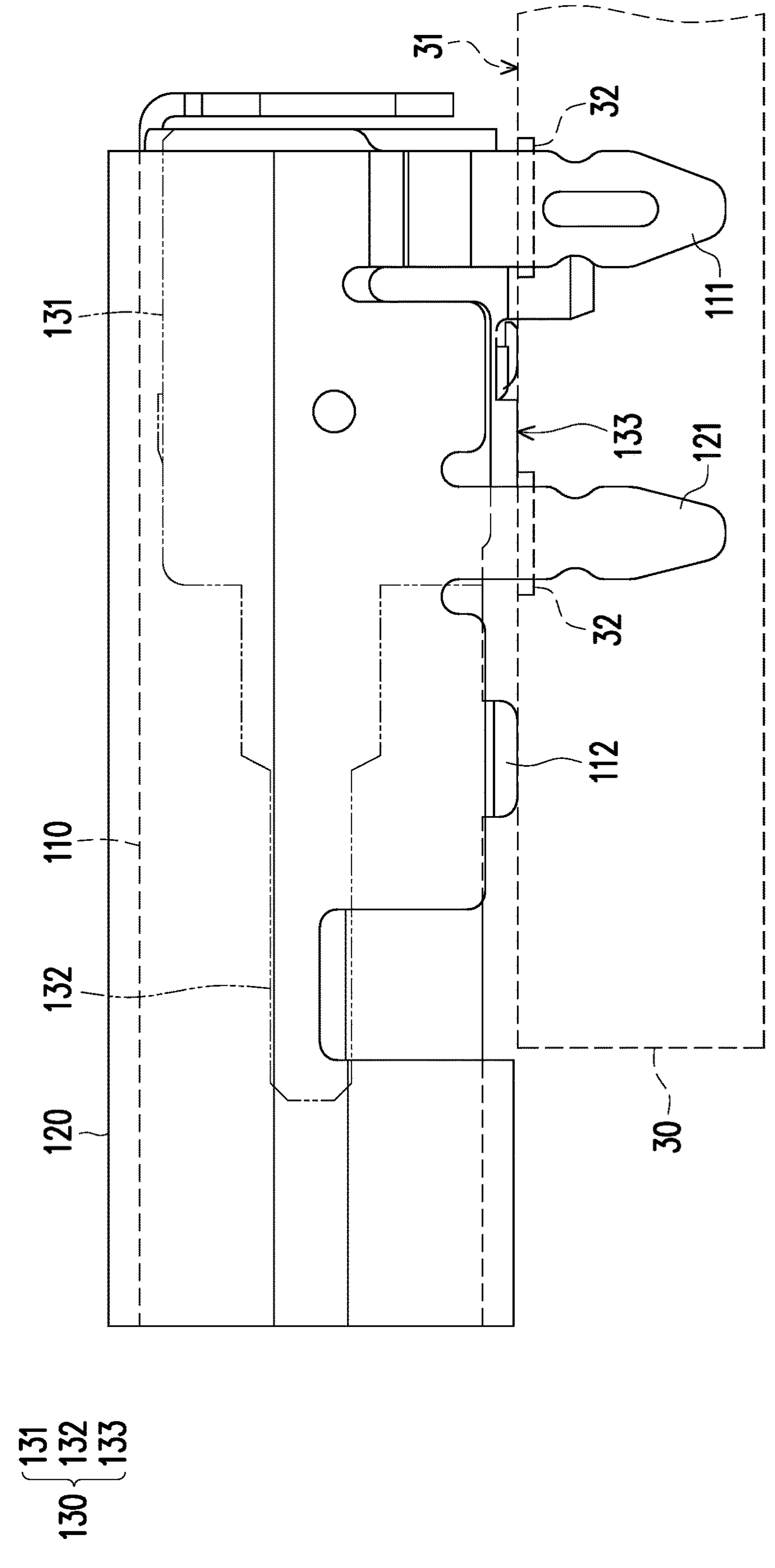
FIG. 2 is a schematic view of the electrical connector of FIG. 1 on a circuit board.
Figure 3:
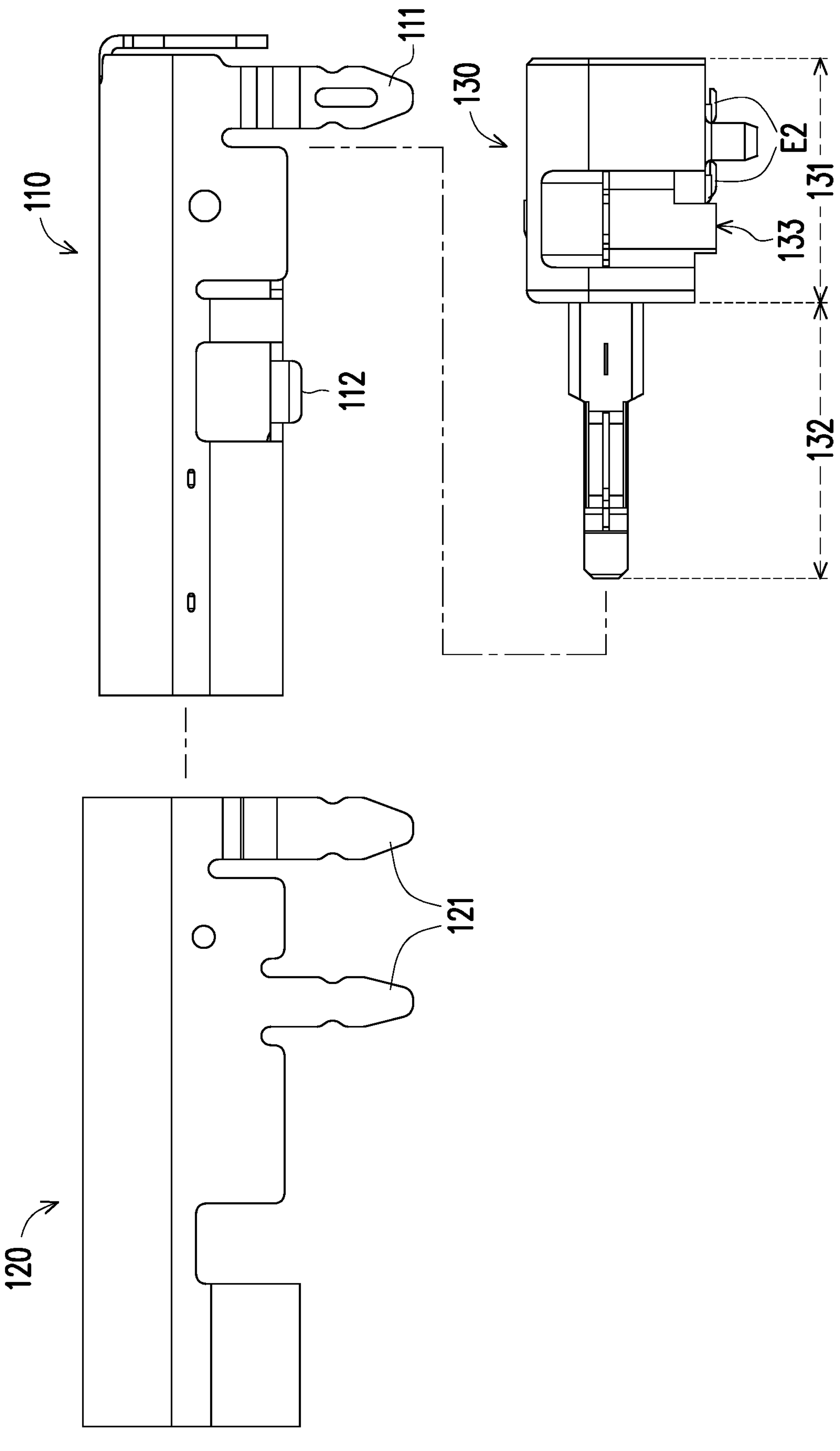
FIG. 3 is a simplified schematic exploded view of the electrical connector of FIG. 2.

FIG. 2 is a schematic view of the electrical connector of FIG. 1 on a circuit board. FIG. 3 is a simplified schematic exploded view of the electrical connector of FIG. 2. Referring to all FIG. 1 to FIG. 3, in addition, the electrical connector 100 of the embodiment is a socket electrical connector configured to be soldered to a circuit board 30. The first metal shell 110 has a plurality of first metal pins 111 soldered or mounted to the circuit board 30, and the second metal shell 120 has a plurality of second metal pins 121 soldered or mounted to the circuit board 30. The first metal pins 111 and the second metal pins 121 are used to provide strong board retention or provide grounding to PCB. It is worth mentioning that, as shown in FIG. 2 and FIG. 3, after the insulating body 130 is further divided into the base 131 and the tongue 132 along an insertion axis of the electrical connector 100, the first metal pins 111 and the second metal pins 121 are soldered to a plurality of grounding portions 32 (e.g., grounding pads) of the circuit board 30, and are both located beside the base 131 of the insulating body 130 and away from the tongue 132. A part of the first metal pins 111 and a part of the second metal pins 121 are stacked on each other.

Accordingly, in order to prevent the electrical connector 100 from tilting forward during plugging and unplugging, the first metal shell 110 of the embodiment further has a supporting portion 112 which is close to the tongue 132 and away from the base 131, and abuts against a non-conducting portion of the circuit board 30, i.e., abutting against an insulating surface 31 of the circuit board 30, so that the electrical connector 100 is stably supported on the circuit board 30.

In other words, taking the terminals 140 as a reference, each of the terminals 140 has a connection end E1 and a soldering end E2 opposite to each other, and the connection end E1 is exposed from the tongue 132 and configured to be connected with the terminal of another electrical connector. The soldering end E2 protrudes from the base 131 in a direction deviating from the connection end E1 and is soldered to the circuit board 30. The first metal pins 111 and the second metal pins 121 are close to the soldering end E2 and away from the connection end E1, whereas the supporting portion 112 is close to the connection end E1 and away from the soldering end E2.

As shown in FIG. 1, the first metal pins 111 and the second metal pins 121 are substantially located on two opposite sides of the overall structure, and as shown in FIG. 2, the first metal pins 111 and the second metal pins 121 are substantially located on the back side of the overall structure (the right side in FIG. 2), therefore, for the overall structure of the electrical connector 100, when the supporting portion 112 does not exist, a partial structure on the front side (the left side in FIG. 2) is substantially in suspension with respect to the circuit board 30, and thus in the process of plugging and unplugging the electrical connector 100 and the another electrical connector, a torque is obviously applied to the electrical connector 100, which may jeopardize a soldering (electrical connection) relationship between the electrical connector 100 and the circuit board 30 as the number of times of plugging and unplugging increases, and even cause the electrical connector 100 to fall off the circuit board 30. As shown in FIG. 2, the orthographic projection of the supporting portion 112 on the insulating body 130 is located at the junction of the base 31 and the tongue 132, and the respective orthographic projections of the first metal pins 111 and the second metal pins 121 on the insulating body 130 are located in the base 131 (and away from the tongue 132).

Accordingly, in the embodiment, the supporting portion 112 is formed by performing a partial notch bending structure on a bottom portion of the first metal shell 110, so that the supporting portion 112 forms a triangle-like supporting configuration (a triangular configuration located on the insulating surface 31 and formed of the supporting portion 112 and the plurality of first metal pins 111 and the plurality of second metal pins 121 on the two opposite sides) with a part of the first metal pins 111 and a part of the second metal pins 121, so that the electrical connector 100 also has a structural abutting relationship with the circuit board 30 close to the front side of the overall structure, and the overall structure of the electrical connector 100 is stably located on an upper surface of the circuit board 30.

In addition, the insulating body 130 of the embodiment further includes another supporting portion 133, which is located in the base 131 and abuts against the circuit board 30. The supporting portion 133 serves as an auxiliary structure and is configured to increase a contacting area between the electrical connector 100 and the circuit board 30.

Figure 4:
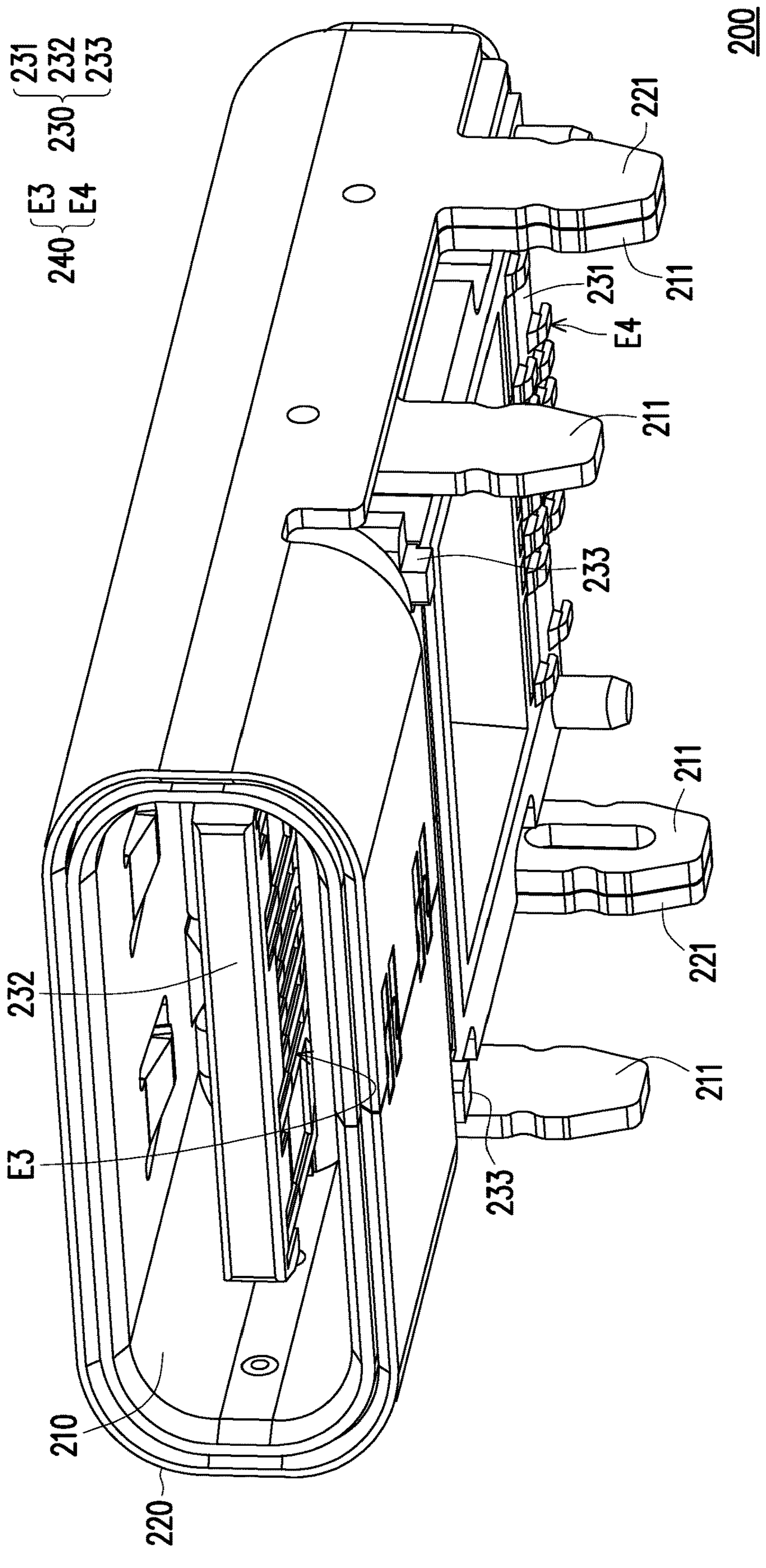
FIG. 4 is a schematic view of an electrical connector according to another embodiment of the disclosure.
Figure 5:
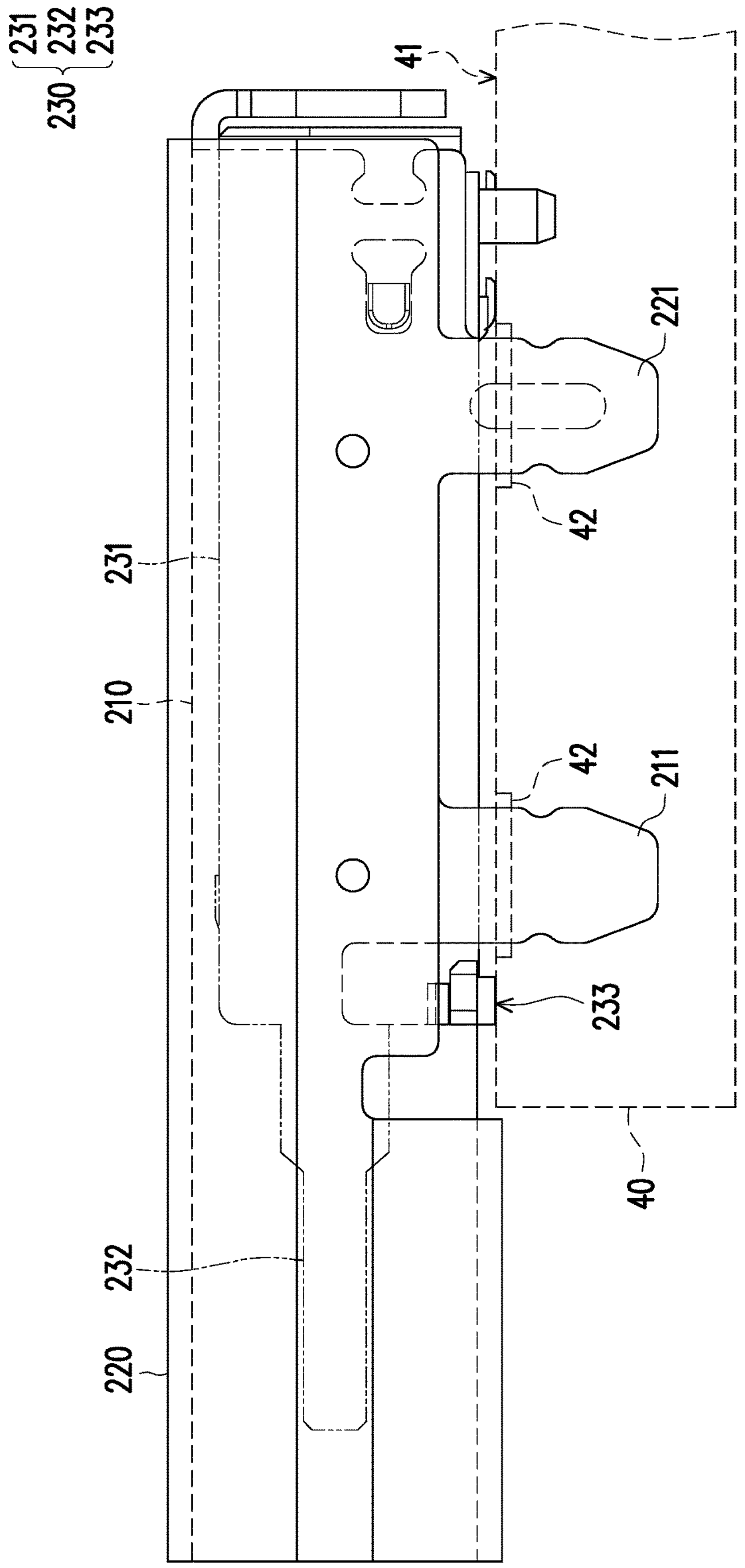
FIG. 5 is a schematic view of the electrical connector of FIG. 4 on a circuit board.
Figure 6:
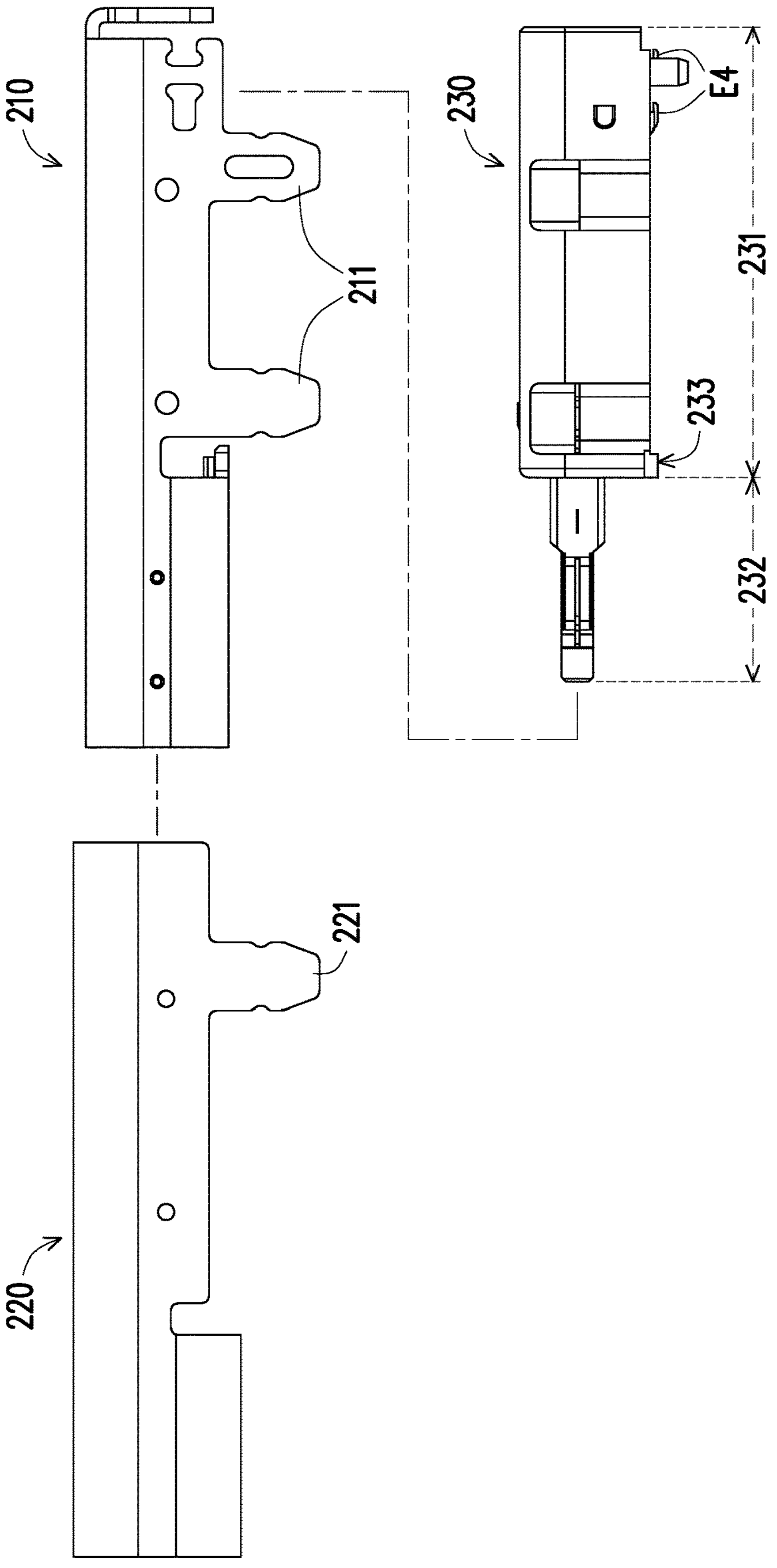
FIG. 6 is a simplified schematic exploded view of the electrical connector of FIG. 5.

FIG. 4 is a schematic view of an electrical connector according to another embodiment of the disclosure. FIG. 5 is a schematic view of the electrical connector of FIG. 4 on a circuit board. FIG. 6 is a simplified schematic exploded view of the electrical connector of FIG. 5. Referring to all FIG. 4 to FIG. 6, in the embodiment, an electrical connector 200 is configured to be assembled to a circuit board 40. The electrical connector 200 includes an insulating body 230, a plurality of terminals 240, a first metal shell 210, and a second metal shell 220. The insulating body 230 has a base 231 and a tongue 232. The terminals 240 are disposed in the insulating body 230. The first metal shell 210 covers the insulating body 230 and has a plurality of first metal pins 211 soldered to the circuit board 40. The second metal shell 220 covers the insulating body 230 and the first metal shell 210. The second metal shell 220 has a plurality of second metal pins 221 soldered to the circuit board 40. The first metal pins 211 and the second metal pins 221 are both located beside the base 231 of the insulating body 230 and away from the tongue 232.

Moreover, the insulating body 230 of the embodiment has a supporting portion 233 abutting against a non-conducting portion (i.e., an insulating surface 41) of the circuit board 40, so that the electrical connector 200 is supported on the circuit board 40. The supporting portion 233 is close to the tongue 232 and away from the base 231. Here, the supporting portion 233 is a protruding column structure extending from the insulating body 230. The orthographic projection of the supporting portion 233 on the insulating body 230 (the remaining structure that is not the supporting portion 233) is located at the junction of the base 231 and the tongue 232. Simply put, the protruding column structure is located at a part of the base 231 adjacent to the tongue 232, and the respective orthographic projections of the first metal pins 211 and the second metal pins 221 on the insulating body 230 are located in the base 231, and are relatively away from the tongue 232.

Therefore, the supporting portion 233 of the embodiment, like the supporting portion 112, forms a triangle-like supporting configuration with a part of the first metal pins 211 and a part of the second metal pins 221 that are soldered to grounding portions 42 of the circuit board 40. In other words, taking the terminal 240 as a reference, the first metal pins 211 and the second metal pins 221 are also located close to a soldering end E4 of the terminal 240 and away from a connection end E3 of the terminal 240, and the supporting portion 233 is close to the connection end E3 of the terminal 240 and away from the soldering end E4 of the terminal 240, so that the electrical connector 200 can be stably held on the circuit board 40.

It should also be noted that the number of the supporting portions 133 or the supporting portions 233 disclosed in the embodiments is not limited here, if the structure allows, a designer may appropriately increase or decrease the number thereof in a nearby area of the supporting portion 133 or the supporting portion 233 (e.g., forming one single supporting portion 133 or 233 in the center of the bottom portion of the first metal shell 110 or the insulating body 230).

In summary of the above, in the embodiments of the disclosure, the electrical connector is held on the circuit board by respectively soldering the first metal pins and the second metal pins of the first metal shell and the second metal shell to the circuit board. The first metal pins and the second metal pins are close to the base and away from the tongue with respect to the insulating body, and are close to the soldering end and away from the connection end with respect to the terminal. Accordingly, in the disclosure, at least one of the first metal shell and the insulating body further has the supporting portion, which is close to the tongue and away from the base with respect to the insulating body and is close to the connection end and away from the soldering end with respect to the terminal, so that the supporting portion forms the triangle-like configuration with the first metal pins and the second metal pins. With a plane formed by three points, the electrical connector is stably held on the circuit board, so as to effectively prevent the electrical connector from tilting forward tilting with respect to the circuit board.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An electrical connector configured to be assembled to a circuit board, comprising:
- an insulating body having a base and a tongue;
- a plurality of terminals disposed in the insulating body;
- a first metal shell covering the insulating body, and having a plurality of first metal pins soldered to the circuit board; and
- a second metal shell covering the insulating body and the first metal shell, and having a plurality of second metal pins soldered to the circuit board,
- wherein the plurality of first metal pins and the plurality of second metal pins are located beside the base of the insulating body and away from the tongue,
- wherein the first metal shell has a supporting portion abutting against a non-conducting portion of the circuit board, so that the electrical connector is supported on the circuit board, and the supporting portion is close to the tongue and away from the base.

2. The electrical connector according to claim 1, wherein the electrical connector is a socket electrical connector soldered to the circuit board.

3. The electrical connector according to claim 1, wherein each of the plurality of terminals has a connection end and a soldering end opposite to each other, the connection end is exposed from the tongue and configured to be connected with the terminal of another electrical connector, the soldering end protrudes from the base in a direction deviating from the connection end and is soldered to the circuit board, the plurality of first metal pins and the plurality of second metal pins are close to the soldering end and away from the connection end, and the supporting portion is close to the connection end and away from the soldering end.

4. The electrical connector according to claim 1, wherein the plurality of first metal pin and the plurality of second metal pin are soldered to a plurality of grounding portions of the circuit board.

5. The electrical connector according to claim 1, wherein the supporting portion is a partial notch bending structure of the first metal shell.

6. The electrical connector according to claim 5, wherein the insulating body further comprises another supporting portion located in the base and abutting against the circuit board.

7. The electrical connector according to claim 1, wherein an orthographic projection of the supporting portion on the insulating body is located at a junction of the base and the tongue, and respective orthographic projections of the plurality of first metal pins and the plurality of second metal pins on the insulating body are located in the base.

8. The electrical connector according to claim 6, wherein the another supporting portion is a protruding column structure extending from the insulating body.

9. The electrical connector according to claim 8, wherein the protruding column structure is located at a part of the base adjacent to the tongue.

10. The electrical connector according to claim 1, wherein a part of the plurality of first metal pins and a part of the plurality of second metal pins are stacked on each other and located on a side of the insulating body, the supporting portion is located on a bottom portion of the first metal shell and forms a triangle-like supporting configuration with the part of the plurality of first metal pins and the part of the plurality of second metal pins.

11. An electrical connector configured to be assembled to a circuit board, comprising:

an insulating body having a base and a tongue;

a plurality of terminals disposed in the insulating body; and a first metal shell covering the insulating body, and having a plurality of first metal pins mounted to the circuit board;

wherein the plurality of first metal pins are located beside the base of the insulating body and away from the tongue, wherein the first metal shell has a supporting portion abutting against a non-conducting portion of the circuit board, so that the electrical connector is supported on the circuit board, and the supporting portion is close to the tongue and away from the base.

12. The electrical connector according to claim 11, wherein a part of the plurality of first metal pins and a part of the plurality of second metal pins are stacked on each other and located on a side of the insulating body, the supporting portion is located on a bottom portion of the first metal shell and forms a triangle-like supporting configuration with the part of the plurality of first metal pins and the part of the plurality of second metal pins.

13. The electrical connector according to claim 11, further comprising a second metal shell covering the insulating body and the first metal shell, and having a plurality of second metal pins mounted to the circuit board.

14. The electrical connector according to claim 13, wherein each of the plurality of terminals has a connection end and a soldering end opposite to each other, the connection end is exposed from the tongue and configured to be connected with the terminal of another electrical connector, the soldering end protrudes from the base in a direction deviating from the connection end and is soldered to the circuit board, the plurality of first metal pins and the plurality of second metal pins are close to the soldering end and away from the connection end, and the supporting portion is close to the connection end and away from the soldering end.

15. The electrical connector according to claim 13, wherein the plurality of first metal pin and the plurality of second metal pin are soldered to a plurality of grounding portions of the circuit board.

16. The electrical connector according to claim 13, wherein an orthographic projection of the supporting portion on the insulating body is located at a junction of the base and the tongue, and respective orthographic projections of the plurality of first metal pins and the plurality of second metal pins on the insulating body are located in the base.

17. The electrical connector according to claim 11, wherein the supporting portion is a partial notch bending structure of the first metal shell.

18. The electrical connector according to claim 17, wherein the insulating body further comprises another supporting portion located in the base and abutting against the circuit board.

19. The electrical connector according to claim 18, wherein the another supporting portion is a protruding column structure extending from the insulating body.

20. The electrical connector according to claim 19, wherein the protruding column structure is located at a part of the base adjacent to the tongue.

* * * * *